United States Patent Office 3,023,409
Patented Feb. 27, 1962

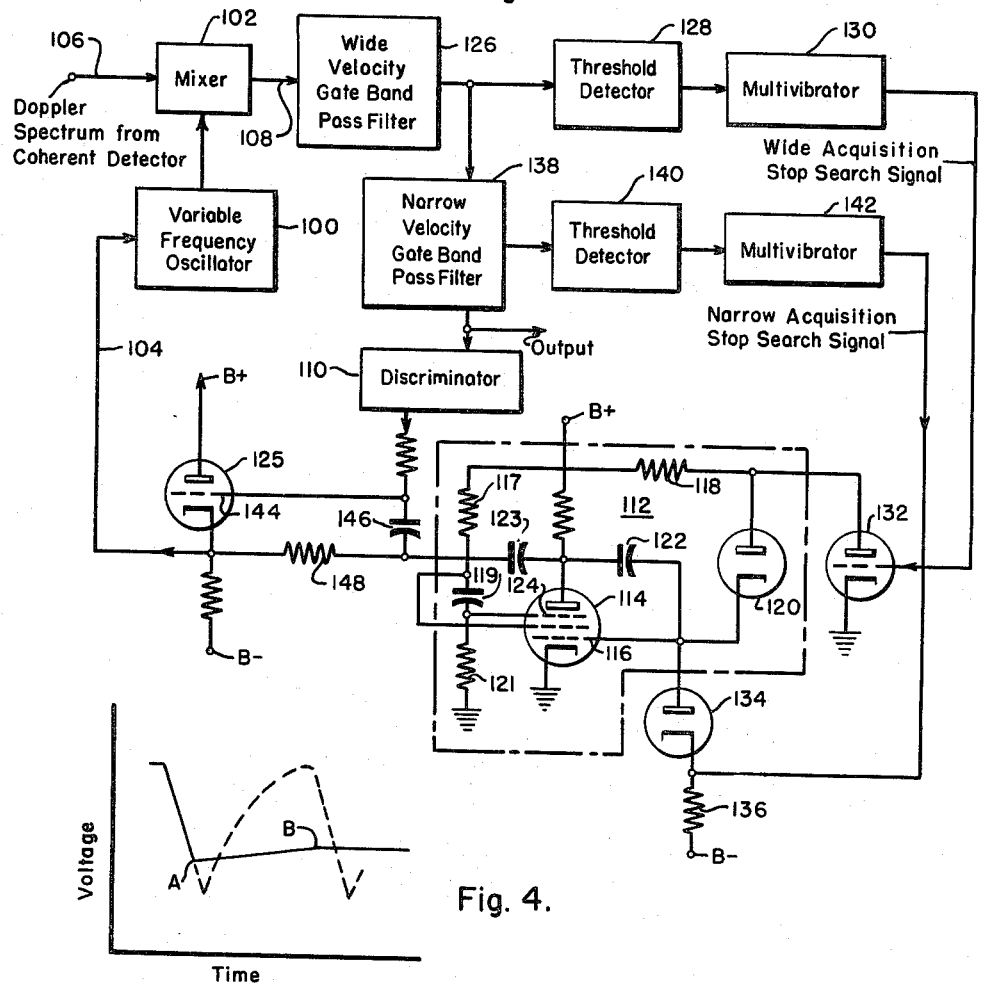
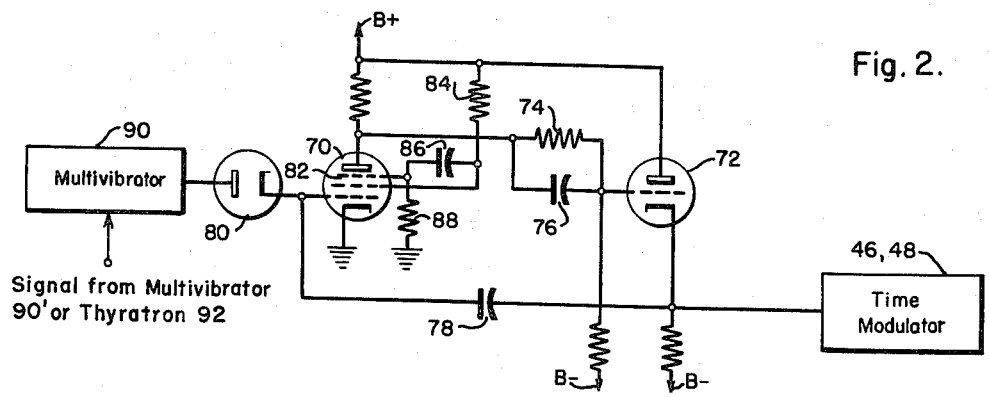

3,023,409
PULSE DOPPLER RADAR SYSTEM
Harry B. Smith, Catonsville, David H. Mooney, Jr., Glen Burnie, and Walter Ewanus, Baltimore, Md., assignors to Westinghouse Electric Corporation, East Pittsburgh, Pa., a corporation of Pennsylvania
Filed Mar. 9, 1956, Ser. No. 570,444
13 Claims. (Cl. 343—13)

This invention relates to pulse Doppler radar systems and, more particularly, to a pulse Doppler radar system having a pulse recurrence time interval less than the time elapse between transmission and reception of an energy pulse reflected from a distant object.

In many airborne pulse radar systems there is an inherent inability to detect and lock on a low flying target except at unacceptably short range because of the inability of the radar system to discern a moving target from unwanted echoes or ground clutter. The ground clutter arises by virtue of the fact that ground reflections, together with reflections from true airborne objects, are detected by the radar receiver and tend to clutter the radar intelligence. That is, the unwanted ground reflections tend to obliterate the desired reflections from true moving airborne objects. While some of this clutter can be cancelled by the addition of a delay line cancellation MTI feature, such cancellation is limited to a small angular region dead ahead of the aircraft and, even at best, its performance deteriorates rapidly as the speed of the aircraft on which the radar set is mounted increases. Furthermore, restrictions on antenna dimensions and the need for a relatively low pulse repetition frequency to avoid the so-called second time around echo (STAE) aggravates the situation to a degree to preclude an adequate solution to the low altitude problem.

The problem of ground clutter can be solved by the use of a pulse Doppler radar system which employs the principle of the Doppler shift in frequency to discern moving objects from stationary objects. If pulses of energy of a particular frequency are transmitted from a stationary installation, those which strike the ground or some other stationary object will be received back at the radar set with the same frequency at which they were transmitted. Those which strike moving objects, however, will experience a Doppler shift in frequency and will be received back at the radar set with a frequency other than that at which they were transmitted. By providing suitable filtering and detecting apparatus, the pulsed signals having the frequency of moving targets can be separated from those which strike stationary objects. If the radar set is moving, as is the case with airborne installations, the problem is complicated somewhat since the ground is moving relative to the radar set. However, the variation in frequency between the signals received from the ground and those received from other objects also moving relative to the ground is such that the moving target signals can be separated and the returns from the ground eliminated.

The range of a moving target is determined with pulse Doppler radar in the same manner as with conventional radar. That is, the time required for an energy pulse to be reflected from a distant target and received by the radar set is measured, this time being proportional to true range. In most conventional radar systems of the pulse and pulse Doppler type, a transmitted energy pulse is reflected from a distant object and returned before the next subsequent pulse is transmitted. In this case the problem of range measurement is relatively simple since the time interval between transmission and reception of a pulse is a true measure of range.

It can be shown mathematically that the pulse repetition rate of the energy pulses transmitted from a pulse Doppler installation must be twice the Doppler frequency corresponding to the relative speed of a target being tracked. A greater degree of resolution between moving and stationary targets is achieved by increasing pulse repetition frequency. If the speed of a target being tracked is high enough it will be necessary to increase the pulse repetition rate of transmitted signals to the point where two or more successive pulses are transmitted before a reflected pulse will arrive back at the radar set. When the pulse repetition frequency is increased in this manner, the problem of range measurement becomes complex since it is no longer apparent from an examination of the received video wave form which one of the many reflected energy pulses is the echo of a particular transmitted pulse. Consequently, the distance between a transmitted pulse and its reflected echo cannot be measured by conventional means.

It is an object of this invention to provide a new and improved pulse Doppler radar system.

More specifically, it is a primary object of the invention to provide means for determining true range in a pulse Doppler radar system wherein the time duration between successive transmitted pulses is less than the time for a reflected energy pulse to arrive back at the radar set.

In accordance with the invention, hereinafter described, two values of the transmitted pulse repetition frequency are employed which have a common submultiple. Initially, when the radar antenna is searching for a target, the first pulse repetition frequency is used. When a target is detected in the searching process, the antenna stops. At the same time, a tracking gate is produced which, in effect, is a series of voltage pulses which have the same pulse repetition frequency and phase position as the target returns at this first pulse repetition frequency. The relative position of this gate is stored in a memory circuit as a direct current voltage. Now, the frequency of the transmitted pulses is shifted to the second pulse repetition frequency and a second tracking gate is produced and its position is stored in a memory circuit. If the two tracking gates are passed through a coincidence gate, they will coincide periodically and produce an output pulse. These output pulses are then compared in phase with a series of pulses having a pulse repetition frequency equal to the difference between the first and second pulse repetition frequencies to produce a direct current output voltage which is proportional to true range.

Further objects and features of the invention will become apparent from the following detailed description taken in connection with the accompanying drawings which form a part of this specification and in which:

FIG. 2 is a schematic circuit diagram of the range search and storage circuits shown in block form in FIG. 1;

FIG. 3 is a circuit diagram of the variable filter means shown in FIG. 1;

FIG. 4 is a wave form illustrating the operation of the circuit shown in FIG. 3.

Figure 1:
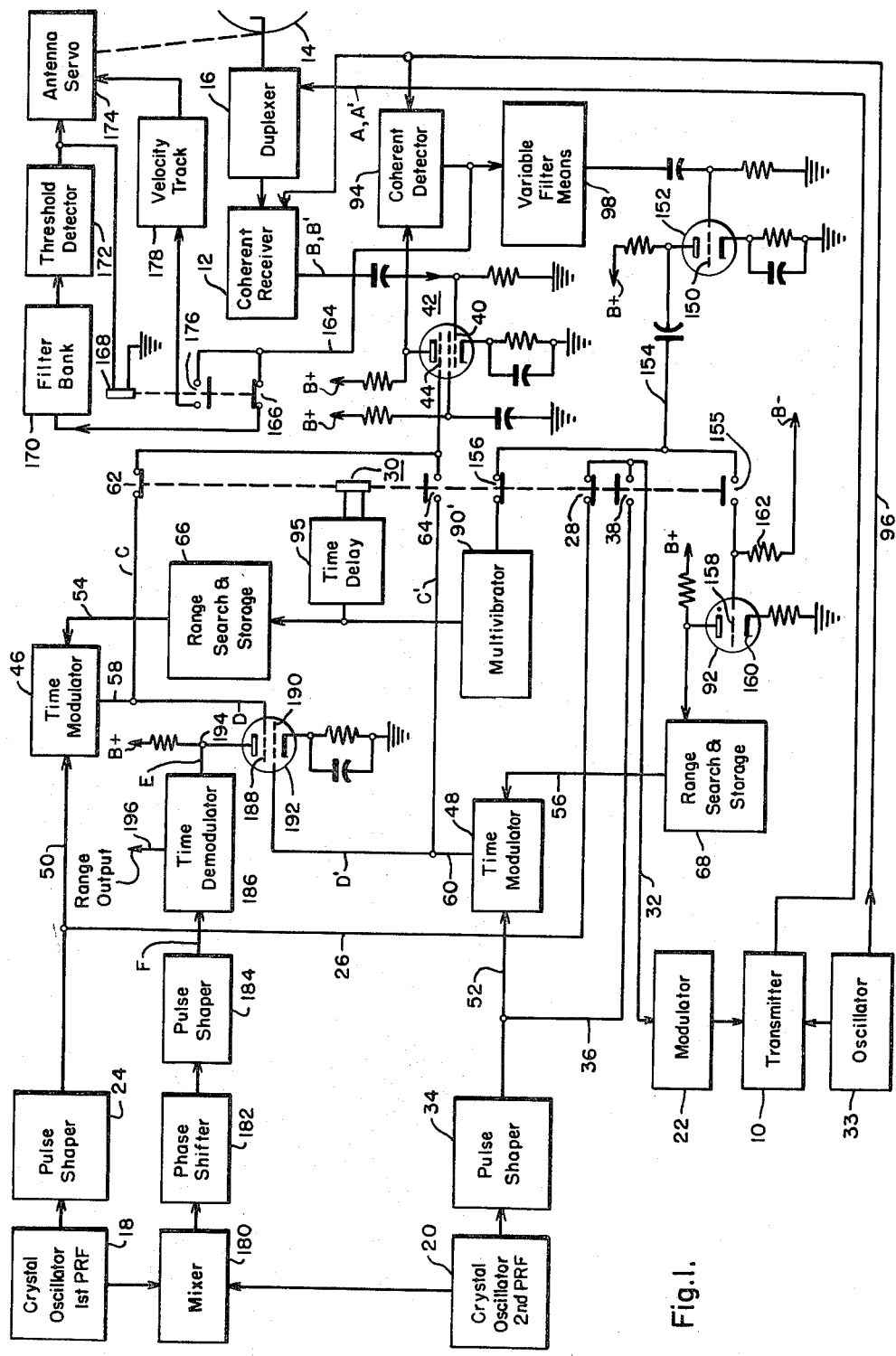
FIGURE 1 is a schematic circuit diagram of a pulse Doppler radar system employing the principles of the invention.

Referring to FIG. 1, the system shown comprises a transmitter 10 and a receiver 12 coupled to a directional antenna 14 by a conventional duplexer 16. Two crystal oscillators 18 and 20 having different frequencies are provided. These oscillators are adapted to trigger a modulator 22 to generate pulses of radio frequency energy which are radiated from antenna 14 via transmitter 10. The sine wave from oscillator 18 is formed into pulses in pulse shaper 24. From shaper 24, the pulses pass through line 26, the normally closed contacts 28 of relay 30 and line 32 to modulator 22. Likewise, the sine wave from oscillator 20 is adapted to pass through pulse shaper 34, line 36, the normally open contacts 38 of relay 30 and line 32 to the modulator 22. The pulsed energy from modulator 22 is combined with radio frequency carrier energy from oscillator 33 in transmitter 10. Received energy pulses, after detection in receiver 12, are applied to the control grid 40 of a pentode 42. Under normal conditions, the bias on the suppressor grid 44 of pentode 42 is beyond cut-off. The peak voltage of detected pulses applied to control grid 40 is insufficient to initiate conduction in the tube. Conduction can be initiated only upon coincidence of a pulse on control grid 40 with a pulse on suppressor grid 44.

The voltage pulses applied to suppressor grid 44 are supplied from one of two time modulators 46 or 48. As is well known to those skilled in the art, a time modulator comprises a circuit adapted to produce a train of uniformly spaced output pulses having a pulse repetition frequency equal to the repetition frequency of pulses transmitted from the radar system. As shown, pulses of the first repetition frequency are fed to modulator 46 via line 50 and those of the other repetition frequency are fed to modulator 48 via line 52. The output pulses from the time modulators are positioned in phase with respect to the transmitted energy pulses from the radar system as a function of a direct current control voltage. This control voltage is fed to modulator 46 via line 54, and to modulator 48 via line 56. The output pulses from modulators 46 and 48 appear on lines 58 and 60, respectively. Although the functional description of the time modulators given above should suffice for purposes of the present specification, a full and detailed description of various types of time modulators may be found in Wave Forms, volume 19, MIT Radiation Laboratories Series, by D. Sayre, McGraw-Hill Book Company, Inc., New York, 1949.

Under normal operating conditions, the output pulses of time modulator 46 are applied to suppressor grid 44 of pentode 42 through the normally closed contacts 62 of relay 30. Output pulses from time modulator 48 are adapted to be applied to suppressor grid 44 through the normally open contacts 64 of relay 30.

The direct current control voltages for time modulators 46 and 48 are supplied from range search and storage circuits 66 and 68, respectively. The output of these circuits is a repetitive, linearly decreasing voltage somewhat like a sawtooth wave form. One type of range search and storage circuit which may be used in the present invention is shown schematically in FIG. 2.

Referring to FIG. 2, the range search and storage circuit comprises a free running sawtooth generator of the Miller integrator type consisting of a pentode 70 and a cathode follower 72. The anodes of tubes 70 and 72 are both connected to a common source of anode potential (B+), and the anode of pentode 70 is connected to the grid of tube 72 via resistor 74 and capacitor 76, substantially as shown. A second capacitor 78 couples the cathode of 72 to the control grid of pentode 70, thereby providing capacitive feedback from the output to the control grid of the pentode. Under normal operating conditions, diode 80 is biased in the forward direction, and its effect is negligible. Whenever pentode 70 is conducting, a negative going wave form will appear at its plate by virtue of the flow of current through diode 80. The slope of the wave form is determined in an obvious manner by the circuit parameters. Conduction through pentode 70 is controlled by suppressor grid 82 in order to render the stage free running. This is accomplished by the voltage developed across screen resistor 84 of pentode 70, coupled to suppressor grid 82 through a capacitor 86. With this arrangement, the circuit is made free running by virtue of a transition effect. Whenever pentode 70 conduits, its plate voltage decreases linearly until a low value is reached at which the screen current begins to exhibit a rapid increase. When this occurs, a negative voltage is developed across the screen resistor 84 and is coupled to the suppressor grid by capacitor 86. The result is a regenerative action which serves to cut off the plate current. Plate current remains cut-off until capacitor 86 discharges through resistor 88 enough to permit the cut-off value of the suppressor grid to be overcome. As a result a repetitive, negative going sawtooth wave form will appear at the cathode of triode 72. This voltage is directly coupled to time modulator 46, 48 as a control voltage.

In operation, assuming diode 80 is conducting, the output of pentode 70 will be a repetitive, linear sawtooth controlling the phase of the time modulator 46, 48 output pulses. Upon detection of a signal, signifying coincidence of target returns and the output pulses of time modulator 46, monostable multivibrator 90 will cut-off diode 80 causing the free running sawtooth generator to cease its search phase and be held at a constant voltage at any point along its linear fall. This voltage, then, is the one desired to phase the time modulator 46 correctly to position the pulses over the target return. This resulting phase now becomes the desired stored information.

As shown in FIG. 1, the switching device (i.e., multivibrator 90) for range search and storage circuit 66 is a multivibrator 90', whereas the switching device for circuit 68 is a thyratron 92. The thyratron, also being a switching device, serves the same purpose as the multivibrator 90'. As shown, multivibrator 90' also controls relay 30 through a time delay device 95.

The radar transmitter 10 sends out pulses of radio frequency energy at a particular frequency. In accordance with well-known Doppler theory, if these pulses of radio frequency energy should strike a stationary object, they will be reflected back to antenna 14 with the same frequency at which they were transmitted, assuming the radar set is stationary. If they strike a moving object, however, they will experience a Doppler shift in frequency. It is desirable to separate the target returns from moving targets from those of stationary targets and to pass the moving target returns only to the range tracking portion of the system. To this end, coherent detector 94 is provided. Essentially, the coherent detector is a mixer which produces an output difference frequency. The target returns are mixed with the output of radio frequency oscillator 33 which is fed to the coherent detector 94 through line 96. Target returns from stationary targets, having substantially the same frequency as the transmitted signal, will cancel in the coherent detector 94 which produces no difference frequency output signal. However, target returns from moving targets, having experienced a Doppler shift in frequency, will pass through the coherent detector 94 to a variable filter circuit 98. The filtering circuit employed is essentially a bandpass filter, one possible embodiment of which is shown in detail in FIG. 3.

Referring to FIG. 3, the system shown comprises a variable frequency oscillator 100, the output of which is fed to a mixer 102. The output frequency of oscillator 100 is controlled in a manner well known to those skilled in the art by a direct current control voltage applied to lead 104. Detected video return signals from the radar receiver, not shown, are applied to terminal 106 and are heterodyned with the output of oscillator 100 to produce an intermediate frequency signal appearing on lead 108.

The control voltage applied to lead 104 can be produced by a discriminator 110 or a sawtooth wave generator 112, enclosed by broken lines. Generator 112, being similar to the range search and storage circuit shown in FIG. 2, comprises a pentode vacuum tube 114 having control, screen and suppressor grids included therein, The control grid 116 is connected to a source of positive potential through resistor 118 and a diode 120. Under normal operating conditions, diode 120 is biased in the forward direction, and its effect is negligible. A capacitor 122 is connected between the plate of pentode 114 and control grid 116 to render the circuit a feedback or operational integrator. Whenever pentode 114 is conducting, a negative going voltage wave form will appear at its plate by virtue of the flow of current through resistor 118. The slope of the wave form is determined by the RC product of resistor 118 and capacitor 122. Conduction through pentode 114 is controlled by suppressor grid 124 in order to render the stage free-running. This is accomplished by the voltage developed across screen resistor 117, coupled to the suppressor grid through capacitor 119. With this arrangement, the circuit is made free-running by virtue of a transition effect. Whenever pentode 114 conducts, its plate voltage decreases linearly until a low value is reached at which the screen current begins to exhibit a rapid increase. When this occurs, a negative voltage is developed across resistor 117 and is coupled to the suppressor grid by capacitor 119. The result is a regenerative action which serves to cut off the plate current. Plate current remains cut off until capacitor 119 discharges through resistor 121 enough to permit the cut-off value of the suppressor grid to be overcome. In this manner the non-conducting period of pentode 114 can be controlled by the values of capacitor 119 and resistor 121. A repetitive, negative going sawtooth wave form, as shown in FIG. 4, will appear at the plate of pentode 114. This voltage is coupled to oscillator 100 through capacitor 123 and the cathode of triode 125 as shown.

By applying the sawtooth output of generator 112 to oscillator 100, its output frequency is varied periodically between predetermined limits. Consequently, the difference frequency output of the mixer 102 will vary also. The Doppler frequencies from moving targets received by the radar system will produce difference frequencies on lead 108 falling within a definite frequency band. The output of mixer 102 is applied to bandpass filter 126 (called a wide velocity gate) which has a bandpass wide enough to permit an adequate rate of search of the total frequency region anticipated. This process may be referred to as a wide velocity gate search.

In accordance with established filter theory, a Doppler signal from a moving target, when encompassed by the wide velocity gate, will build up in amplitude at a rate inversely proportional to the bandwidth of the filter. If the filter output is sufficient to distinguish it from random noise, its presence is sensed by an amplitude sensitive threshold detector 128 which, in turn, triggers a multivibrator 130 or other similar switching device. When multivibrator 130 is triggered, it applies a positive bias to the control grid of triode 132. Hence, the triode, which is normally cut off, conducts to apply a negative bias to the anode of diode 120. With diode 120 now cut off, the remaining path for current to flow through capacitor 122 is diode 134 and resistor 136 to the negative terminal of an anode voltage source (marked B—). This path now controls the operation of the sawtooth wave generator 112. The results of this action is a positive going linear rise in voltage of low slope, starting at point A as indicated in FIG. 4. The relative slope of this rise is determined in obvious manner by the value of resistor 136 and the magnitude of the B— voltage source.

The variable frequency oscillator 100 is now at a frequency to produce a difference frequency in mixer 102 somewhere within the wide velocity gate bandpass. It is now desired to provide better velocity discrimination of the target. To this end, the output of a narrow velocity gate band-pass filter 138 is examined. By virtue of the low slope of the positive going wave form starting at point A in FIG. 4, a fine sweep of the variable frequency oscillator 100 in a sense opposite that previously used is effected. Since the velocity or frequency region to be searched is now smaller than before, a smaller voltage excursion is needed. The opposite direction of search is employed in this phase of operation since the tendency is for the original search signal to have over-swept the target. The sweep rate of the voltage applied to oscillator 100 is now slower (i.e., its slope is lower) since the build-up time of the signal through narrow gate band-pass filter 138 is slower than that of filter 126 due to its reduced bandwidth.

When the narrow gate bandpass of filter 138 encompasses a signal, its output builds up and is sensed by threshold detector 140 which, in turn, triggers multivibrator 142. The resulting positive output from multivibrator 142 cuts off diode 134 by virtue of a positive bias applied to its cathode. The control grid 116 of pentode 114 is now effectively disconnected from the circuit, and the sawtooth wave generator 112 acts as a storage circuit by virtue of a degenerative feedback voltage through capacitor 122 which maintains its output voltage constant, starting at point B in FIG. 4 until the discriminator 110 can build up sufficient current to assume control of the voltage at grid 144 of the triode 125.

During this time, the output voltage of sweep generator 112 is applied via the cathode of triode 125 to oscillator 100 to maintain its frequency constant. As the speed of the target being tracked varies, its Doppler frequency and the difference frequency from mixer 102 will vary also. In order to compensate for this variation and maintain the difference frequency within the pass band of filter 138, discriminator 110 is employed. Part of the signal passing through filter 138 is applied to the discriminator. When the Doppler frequency of the target changes, the resulting change in the difference frequency output of mixer 102 will cause the discriminator 110 to produce an output current which produces a voltage change at grid 144, the polarity of which depends upon the direction of frequency departure. This output voltage is applied via the cathode of triode 125 to oscillator 100 to adjust its output frequency so that the difference frequency output of mixer 102 falls within the pass band of filter 138. In this manner, the discriminator 110 will compensate for differences in the Doppler frequency due to changes in target velocity once the system has "locked on" a particular target by the process described above. Capacitors 123, 146 and resistor 148 serve to determine the properties of the closed tracking loop.

The output of variable filter means 98 will, therefore, be a pulse of a particular intermediate frequency indicating the existence of a moving target. This pulse is applied to the grid 150 of triode 152. The output of the triode is, in turn, applied through lead 154 and the normally closed contacts 156 of relay 30 to multivibrator 90'. The pulse from triode 152 is also adapted to be applied through normally open contacts 155 to grid 158 of the thyratron 92 which is normally held cut off by a negative voltage applied to grid 158.

The output of coherent detector 94 is also applied through line 164 and the normally closed contacts 166 of relay 168 to a bank of filters 170. Signals passing through the filter bank 170 are detected in threshold detector 172 to produce a direct current signal. This signal has two functions: (1) it triggers the antenna servo 174 to switch from a general scanning motion to a tracking function wherein the antenna 14 follows a particular target; and (2) it actuates relay 168 to open contacts 166 and close contacts 176. When contacts 176 close, the output of coherent detector 94 is applied to a velocity track circuit 178 which functions to cause the antenna servo motor 174 and antenna 14 to automatically track or follow a moving target after it is once detected by the threshold detector 172. Tracking circuits of this type are well known in the art.

Referring again to locked crystal oscillators 18 and 20, the outputs of these two circuits are applied to a mixer circuit 180 which produces a sine wave output signal having a frequency equal to the difference of the frequencies of oscillators 18 and 20. This difference signal is applied through a phase shifter 182 and a pulse shaper 184 to a time demodulator 186. Output voltage pulses from time modulators 46 and 48 are applied to the grids 188 and 190, respectively, of a coincidence detector 192. When the pulses from modulators 46 and 48 coincide, detector 192 will apply a voltage pulse to lead 194 which is connected to time demodulator 186.

The time demodulator 186 compares the phase of the voltage pulses from coincidence detector 192 with the phase of output pulses from pulse shaper 184 to produce a direct current output voltage on lead 196 which is proportional to the difference in phase between these two signals. A full and detailed description of one type of time demodulator which may be used with the present invention may be found in copending application Serial No. 465,168, filed October 28, 1954, and assigned to the assignee of the present application. Other types of time demodulators may be found in the aforesaid volume 19, MIT Radiation Laboratories Series.

Figure 5:
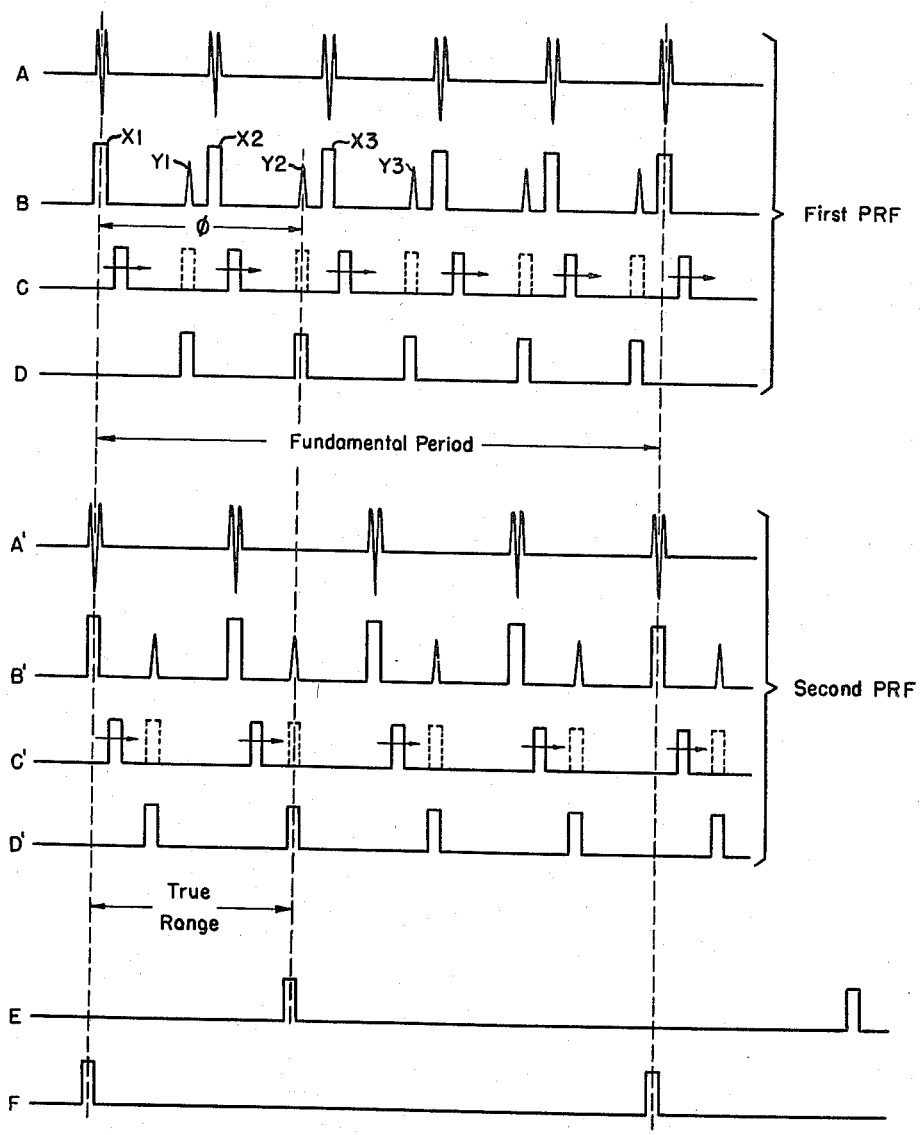
FIG. 5 is an illustration of wave forms appearing at various points in the circuit of FIG. 1.

Operation of the invention may best be understood by reference to FIG. 5 which illustrates wave forms appearing at various points in the circuits of FIG. 1. The wave forms are identified by letters in FIG. 5 and the points at which these wave forms appear in FIG. 1 are indicated by like reference letters.

Under normal conditions when the radar system is searching for a moving target, the crystal oscillator 18 is connected to modulator 22 through pulse shaper 24, line 26, normally closed contacts 28 and line 32. Antenna 14 will be moved through a scanning pattern by servo 174 and the contacts of relay 30 will be in the position shown. The signal of the first pulse repetition frequency transmitted from the transmitter 10 appears as wave form A in FIG. 5. It consists of a series of spaced pulses of radio frequency energy at the first pulse repetition frequency, in this case approximately 120 kilocycles. When the radar beam intercepts a target, the signal from receiver 12 will appear as wave form B. As each pulse is transmitted, a certain amount of radio frequency energy will be deflected to the receiving portion of the antenna 14 and will be detected by the receiver of the system. Hence, a series of pulses X1, X2, X3, etc. (called "main bangs"), will appear in the wave shape. Reflected energy pulses form a target are indicated by pulses Y1, Y2, Y3, etc. The pulse repetition rate of the transmitted pulses is such that two or more pulses will be transmitted from the system before a reflected echo from the target can reach the antenna. This is done to facilitate high speed targets as was explained above, and in this manner the present system differs from a conventional radar system wherein the echo from one transmitted pulse is received by the system before the next subsequent pulse is transmitted. Thus, it is not apparent from an examination of the wave form B whether received pulse Y1, Y2 or Y3 is a reflected pulse of transmitted pulse X1. The distance from X1 to Y1 represents an ambiguous range. The pulses Y1, Y2 and Y3 will always be substantially equidistant (neglecting movement of the target) since their corresponding transmitted pulses are equidistant. For purposes of the present explanation it will be assumed that Y2 is a reflected pulse of X1. Consequently, the distance $\phi$ indicates true range.

Under the normal searching conditions described, multivibrator 90' will apply a positive potential to the diode 80 (FIG. 2) of range search and storage circuit 66. Hence, range search and storage circuit 66 will supply a recurring sawtooth wave form to time modulator 46. The output pulses of time modulator 46, having a pulse repetition frequency equal to that of the transmitted pulses by virtue of its connection to crystal oscillator 18, will be periodically swept over a range equal to the distance between successive transmitted pulses. The sweeping output of time modulator 46, moving from left to right, will appear as wave form C in FIG. 5. These pulses are applied via normally closed contacts 62 to grid 44 in pentode 42. The received signal is applied to grid 40 in pentode 42. In this manner, when the received target returns coincide with the output of modulator 46, pentode 42 will produce a series of output pulses. If the frequency characteristic of these pulses is such as to indicate the existence of a moving target, they will pass through coherent detector 94 and will be applied to filter bank 170 via normally closed contacts 166. The output of the threshold detector 172 will momentarily stop the antenna in its scanning motion and will actuate relay 168 to open contacts 166 and close contacts 176. The signal is now applied to the velocity track circuit 178 which takes over to cause antenna 14 to automatically follow or track the target.

The output of coherent detector 94 is also applied through variable filter 98 to the grid 150 of triode 152. The triode 152 thus produces a pulse at the intermediate frequency of the variable filter means which is applied to multivibrator 90' via lead 154 and normally closed contacts 156. Multivibrator 90' is, therefore, switched from one stable state to the other and applies a negative potential to diode 80 in range search and storage circuit 66. This causes the range search and storage circuit to maintain its output voltage constant in accordance with the explanation given above. As a result the output voltage pulses from time modulator 46, which are applied to grid 188 in coincidence detector 192, are maintained at a constant phase position in coincidence with the return target signals as shown by wave form D.

The negative output from multivibrator 90' also actuates the relay 30 through time delay device 95 to reverse the position of its contacts. Consequently, crystal oscillator 18 is now disconnected from modulator 22, and crystal oscillator 20 is connected to the modulator through pulse shaper 34, line 36, contacts 38 and line 32. A signal of a second pulse repetition frequency, shown as wave form A', is now transmitted from the system. As can be seen in FIG. 5, five pulses at the second pulse repetition frequency will be transmitted over a time interval during which six pulses at the first pulse repetition frequency were transmitted. Returned echoes at the second pulse repetition frequency are now applied to the control grid of pentode 42. However, time modulator 48 is now connected to suppressor grid 44 via contacts 64, and range search and storage circuit 68 is operative since a forward bias is applied to its diode 80. This forward bias results since thyratron 92 is cut off by virtue of the connection of grid 158 to a source of negative potential through resistor 162. Range search and storage circuit 68 will, therefore, apply a repetitive sawtooth wave form to time modulator 48 which will, in turn, supply a series of output pulses (wave form C') at the second pulse repetition frequency which are periodically swept over a range equal to the distance between successive transmitted pulses. These pulses are applied via contacts 64 to grid 44 in pentode 42. The output pulses from the modulator 48 are also applied to grid 190 and coincidence detector 192. When these pulses from modulator 48 on grid 44 coincide with the target returns on grid 40 at the second pulse repetition frequency, the pulse which passes through coherent detector 94, filter means 98, triode 152 and contacts 155 to grid 158 in thyratron 92 will initiate conduction in the thyratron, thereby cutting off diode 80 in range search and storage circuit 68. Consequently, range search and storage circuit 68 will hold its output voltage constant and the output of the time modulator 48 will appear as wave form D' in FIG. 5.

The wave forms D and D' are thereafter compared in coincidence detector 192. It can be seen that only the second output pulse of time modulators 46 and 48 coincide. Consequently, coincidence detector 192 will apply an output pulse to the time demodulator 186 at this point, the output pulses in the coincidence detector appearing as wave form E. The difference frequency output of pulse shaper 184 will appear as wave form F in FIG. 5. Time demodulator 186 will compare the phase difference between the pulses in wave forms E and F to produce an output voltage indicating true range. This output voltage may then be used to initiate conditions in an automatic range tracking circuit, not shown.

Although the invention has been described in connection with a certain specific embodiment, it should be readily apparent to those skilled in the art that various changes in form and arrangement of parts can be made without departing from the spirit and scope of the invention.

We claim as our invention:

1. In a pulse Doppler radar system, means for transmitting energy pulses, receiving means for detecting echoes of said transmitted pulses, first means for causing said transmitting means to radiate energy pulses having a first pulse repetition frequency, a first device for producing a linearly varying direct current control voltage, a first time modulator responsive to said direct current control voltage for producing spaced output pulses having a pulse repetition frequency equal to said first pulse repetition frequency and a phase position relative to pulses transmitted at said first pulse repetition frequency which is a function at any instant of said direct current control voltage, means to cause said first device to hold its output voltage constant upon phase coincidence of the output pulses of said first time modulator and reflected echoes detected by said receiving means, second means for causing said transmitting means to radiate energy pulses having a second pulse repetition frequency, means for disabling said first means and for enabling said second means upon the aforesaid phase coincidence, a second device for producing a linearly varying direct current control voltage, a second time modulator responsive to the control voltage from said second device for producing spaced output pulses having a pulse repetition frequency equal to said second pulse repetition frequency and a phase position relative to pulses transmitted at said second repetition frequency which is a function at any instant of the control voltage from said second device, means to cause said second device to hold its output voltage constant upon phase coincidence of the output pulses of said second time modulator and reflected echoes detected by said receiving means, and means for comparing the output pulses from said first and second time modulators to produce a resultant voltage pulse upon coincidence of said output pulses.

2. The combination claimed in claim 1 and including means for producing pulses having a repetition frequency equal to the difference between said first and second repetition frequencies, and means for producing a direct current output voltage which is proportional to the phase difference between said latter-mentioned pulses and said resultant pulses.

3. In a radar system, means for transmitting energy pulses, means for receiving echoes of said transmitted pulses, first means for causing said transmitting means to radiate energy pulses having a first pulse repetition frequency, a first device for producing a series of equally spaced output voltage pulses which uniformly vary in phase while maintaining a pulse repetition frequency equal to said first repetition frequency, means to cause said first device to hold the phase of its output pulses constant upon phase coincidence of said output pulses with received echoes detected by said receiving means, second means for causing said transmitting means to radiate energy pulses having a second pulse repetition frequency, means for disabling said first means and for enabling said second means upon the aforesaid phase coincidence of said output pulses and said detected echoes, a second device for producing a series of equally spaced output voltage pulses which uniformly vary in phase while maintaining a pulse repetition frequency equal to said second repetition frequency, means to cause said second device to hold the phase of its output pulses constant upon phase coincidence of said latter-mentioned output pulses with echoes detected by said receiving means, and means for comparing the output pulses of said first and second devices to produce a resultant pulse whenever the output pulses from said devices coincide in phase.

4. In a radar system, means for normally transmitting energy pulses having a first pulse repetition frequency, means for receiving echoes of transmitting pulses, a first time modulator for producing a series of equally spaced voltage pulses of variable phase, means to cause said first time modulator to hold the phase of its output pulses constant upon phase coincidence of said output pulses with echoes of said first repetition frequency detected by said receiving means, means to cause said transmitting means to transmit energy pulses having a second pulse repetition frequency, a second time modulator for producing a series of equally spaced voltage pulses of variable phase, means to cause said second time modulator to hold the phase of its output pulses constant upon phase coincidence of said latter-mentioned output pulses with echoes having said second repetition frequency, and means for comparing in phase the output pulses of said first and second time modulators to produce a resultant pulse whenever output pulses from said time modulators coincide in phase.

5. The combination claimed in claim 4 and including means for producing a series of pulses having a pulse repetition frequency equal to the difference between said first and second pulse repetition frequencies, and means responsive to said latter-mentioned series of pulses and said resultant pulses for producing a direct current voltage.

6. In a radar system, means for normally transmitting a train of energy pulses having a first pulse repetition frequency, means for receiving a train of energy pulses reflected from a distant object, means for producing a first train of voltage pulses having a pulse repetition frequency equal to said first repetition frequency, each of said pulses in said first train having a phase position equal to the phase position of a corresponding reflected energy pulse received by said receiving means at said first repetition frequency, said means for producing a first train of voltage pulses including means for storing a voltage proportional to the ambiguous range of the reflected energy pulses and first pulse time modulator means having pulses corresponding to the transmitted energy pulses applied thereto and having the stored voltage applied thereto to control the pulse delay therein, means for transmitting a train of energy pulses having a second pulse repetition frequency, means for producing a second train of voltage pulses having a pulse repetition frequency equal to said second repetition frequency, each of said pulses in said second train having a phase position equal to the phase position of a corresponding reflected energy pulse received by said receiving means at said second repetition frequency, said means for producing a second train of voltage pulses including means for storing an additional voltage proportional to the ambiguous range of the reflected energy pulses at the second pulse repetition frequency and second time modulator means having pulses corresponding to the transmitted energy pulses at the second pulse repetition frequency applied thereto and having said additional stored voltage applied thereto to control the pulse delay therein, and means for comparing said first and second trains of voltage pulses to produce a resultant voltage pulse upon coincidence of a pulse in said first train with a pulse in said second train.

7. In a radar system, means for normally transmitting a train of energy pulses having a first pulse repetition frequency, means for receiving a train of energy pulses reflected from a distant object, means for producing a first train of voltage pulses corresponding to a train of energy pulses of said first pulse repetition frequency received by said receiving means, said means for producing a first train of voltage pulses including means for storing a voltage proportional to the ambiguous range of reflected energy pulses and first pulse time modulator means having pulses corresponding to the transmitted energy pulses applied thereto and having the stored voltage applied thereto to control the pulse delay therein, means adapted to cause said transmititng means to change the pulse repetition frequency of its transmitted pulses from said first repetition frequency to a second pulse repetition frequency, means for producing a second train of voltage pulses corresponding to a train of energy pulses of said second pulse repetition frequency received by said receiving means, said means for producing a second train of voltage pulses including means for storing an additional voltage proportional to the ambiguous range of reflected energy pulses at the second pulse repetition frequency and second time modulator means having pulses corresponding to the transmitted energy pulses at the second pulse repetition frequency applied thereto and having said additional stored voltage applied thereto to control the pulse delay therein, and means for comparing said first and second trains of voltage pulses to produce a resultant voltage pulse upon coincidence of a pulse in said first train with a pulse in said second train.

8. In a radar system, in combination, means for normally transmitting a train of energy pulses having a first pulse repetition frequency, means for receiving a train of energy pulses reflected from a distant object, means for producing a first train of voltage pulses corresponding to a train of energy pulses of said first pulse repetition frequency received by said receiving means, means adapted to cause said transmitting means to change the pulse repetition frequency of its transmitted pulses from said first repetition frequency to a second pulse repetition frequency, means for producing a second train of voltage pulses corresponding to a train of energy pulses of said second pulse repetition frequency received by said receiving means, means for comparing said first and second trains of voltage pulses to produce a resultant voltage pulse upon coincidence of a pulse in said first train with a pulse in said second train, means for producing a train of voltage pulses having a pulse repetition frequency equal to the difference between said first and second repetition frequencies, and a device for producing an output voltage proportional to the phase difference between said latter-mentioned voltage pulses and said resultant pulses.

9. In a radar system, means for receiving energy pulses reflected from distant objects, means for normally transmitting a train of energy pulses having a first pulse recurrence rate less than the time elapse between transmission and reception of an energy pulse, means for producing a first direct current voltage in response to received energy pulses at said first recurrence rate, the magnitude of said first direct current voltage being a function of the aforesaid time elapse between transmission and reception of an energy pulse, first time modulator means having pulses corresponding to the transmitted energy pulses at the first pulse recurrence rate applied thereto, said first time modulator means also having said first direct current voltage applied thereto to vary the pulse time delay therein, means adapted to change the pulse recurrence rate of energy pulses transmitted from said transmitting means to a second recurrence rate which is less than the time elapse between transmission and reception of an energy pulse, means for producing a second direct current voltage in response to received energy pulses at said second recurrence rate, the magnitude of said second direct current voltage also being a function of the aforesaid time elapse between transmission and reception of energy pulses, second time modulator means having pulses corresponding to the transmitted energy pulses at the second pulse recurrence rate applied thereto, said second time modulator means also having said second direct current voltage applied thereto to control the time delay of pulses therein, and means responsive to the outputs of said first and second time modulator means for producing an output voltage which is proportional to the range of said distant object.

10. In a radar system, means for receiving energy pulses reflected from distant objects, means for normally transmitting a train of energy pulses having a first pulse recurrence rate, means for producing a first voltage in response to received energy pulses at said first recurrence rate, the magnitude of said first voltage being a function of the range of said distant object, means including first time modulator means having pulses corresponding to the transmitted pulses of the first recurrence rate applied thereto, said first time modulator means being operatively connected to the means for producing a first voltage and having the first voltage applied thereto, said first time modulator means utilizing the first voltage to delay the pulses, means adapted to change the pulse recurrence rate of energy pulses transmitted from said transmitting means to a second recurrence rate, means for producing a second voltage in response to received energy pulses at said second recurrence rate, the magnitude of said second voltage also being a function of the range of said distant object, second means including second time modulator means having pulses applied thereto corresponding to the transmitted pulses of the second recurrence rate, the second time modulator means having the second voltage applied thereto, the second time modulator means being constructed and arranged to utilize the second voltage to control the delay of the pulses in the second time modulator means, and means responsive to the outputs of said first and second time modulator means for producing an output voltage which is proportional to the range of said distant object.

11. In a pulse Doppler radar system, means for receiving energy pulses reflected from a distant object, means for transmitting energy pulses having a first pulse repetition frequency, means responsive to energy pulses received at said first repetition frequency for producing a first voltage whose magnitude is a function of the range of said distant object, means for storing said first voltage, means for causing said transmitting means to transmit energy pulses having a second pulse repetition frequency, means responsive to energy pulses received at said second repetition frequency for producing a second voltage whose magnitude is a function of the range of said distant object, a device for producing voltage pulses having a pulse repetition frequency equal to the difference between said first and second repetition frequencies, and means responsive to said voltage pulses and to said first and second voltages for producing an output voltage proportional to the range of said distant object.

12. In a radar system, means for producing a first train of voltage pulses corresponding to a train of video return signals of a first pulse repetition frequency, means for producing a second train of voltage pulses corresponding to a train of video return signals having a second pulse repetition frequency, apparatus for comparing said first and second trains of voltage pulses to produce an output pulse upon coincidence of a pulse in said first train with a pulse in said second train, means for producing a third train of voltage pulses having a pulse repetition frequency equal to the difference between said first and second repetition frequencies, and means for producing a direct current voltage which is proportional to the phase difference between pulses in said third train and output pulses from said apparatus.

13. In a radar system, means for producing a first train of voltage pulses corresponding to a train of video return signals of a first pulse repetition frequency, means for producing a second train of voltage pulses corresponding to a train of video return signals of a second pulse repetition frequency, apparatus for comparing said first and second trains of voltage pulses to produce an output pulse upon coincidence of a pulse in said first train with a pulse in said second train, means operatively connected to the means for producing a first train of voltage pulses and to the means for producing a second train of voltage pulses for producing an additional train of voltage pulses having a pulse repetition frequency equal to the difference between the first and second pulse repetition frequencies, and means operatively connected to the comparing apparatus and to the means for producing a pulse repetition frequency equal to the difference for producing an output voltage proportional to the phase difference between the pulse output of the comparing apparatus and the pulses corresponding to the difference between the first and second pulse repetition frequencies.

References Cited in the file of this patent

UNITED STATES PATENTS

| | | |
|---|---|---|
| 2,423,024 | Hershberger | June 24, 1947 |
| 2,450,945 | Eaton | Oct. 12, 1948 |
| 2,450,946 | Evans | Oct. 12, 1948 |
| 2,452,598 | Page | Nov. 2, 1948 |
| 2,568,441 | Fyler | Sept. 18, 1951 |
| 2,676,317 | Purington | Apr. 20, 1954 |
| 2,717,358 | Munster | Sept. 6, 1955 |